United States Patent [19]
O'Keeffe

[11] Patent Number: 6,135,409
[45] Date of Patent: Oct. 24, 2000

[54] SPECTACLE HOLDER

[75] Inventor: Michael O'Keeffe, Kangaroo Flats, Australia

[73] Assignee: Inventit Pty. Limited, Geelong, Australia

[21] Appl. No.: 09/171,932

[22] PCT Filed: May 2, 1997

[86] PCT No.: PCT/AU97/00267

§ 371 Date: Oct. 26, 1998

§ 102(e) Date: Oct. 26, 1998

[87] PCT Pub. No.: WO97/42445

PCT Pub. Date: Nov. 13, 1997

[30] Foreign Application Priority Data

May 3, 1996 [AU] Australia ............................. 52023/96
May 3, 1996 [AU] Australia ............................... 677360

[51] Int. Cl.[7] ................................................. A47F 5/00
[52] U.S. Cl. ....................... 248/314; 248/318; 248/689; 248/902
[58] Field of Search ................................. 248/314, 689, 248/902, 317, 318

[56] References Cited

U.S. PATENT DOCUMENTS

| | | | |
|---|---|---|---|
| 4,026,508 | 5/1977 | Ziegler | 248/220.3 |
| 4,157,166 | 6/1979 | Voelker | 248/317 |
| 4,239,167 | 12/1980 | Lane | 248/205 |
| 4,339,045 | 7/1982 | Bodin | 211/13 |
| 5,046,696 | 9/1991 | Lee | 248/309.1 |
| 5,340,074 | 8/1994 | Porcaro et al. | 248/309.1 |
| 5,551,126 | 9/1996 | Wallo | 24/3.3 |
| 5,941,487 | 8/1999 | Keely | 248/231.51 |

Primary Examiner—Ramon O Ramirez
Assistant Examiner—Walter Landry
Attorney, Agent, or Firm—Edwin D. Schindler

[57] ABSTRACT

This invention provides a spectacle holder for containment of a pair of spectacles, the holder being attachable to any convenient surface, wherein the holder comprises:

(a) a body (10) having a substantially flat surface (11) for attachment of the holder to the convenient surface;

(b) an upper (as viewed in use) clasp (12) adapted to encircle or partially encircle one arm of a pair of spectacles; and (c) at least one lower (as viewed in use) side support (13A, 13B) adapted to maintain the abovementioned arm in position, wherein the pair of spectacles may be contained by means of insertion of the abovementioned arm through the clasp (12) and through the support or supports and removed as required.

14 Claims, 4 Drawing Sheets

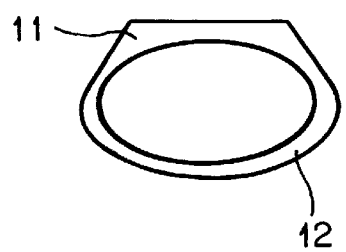
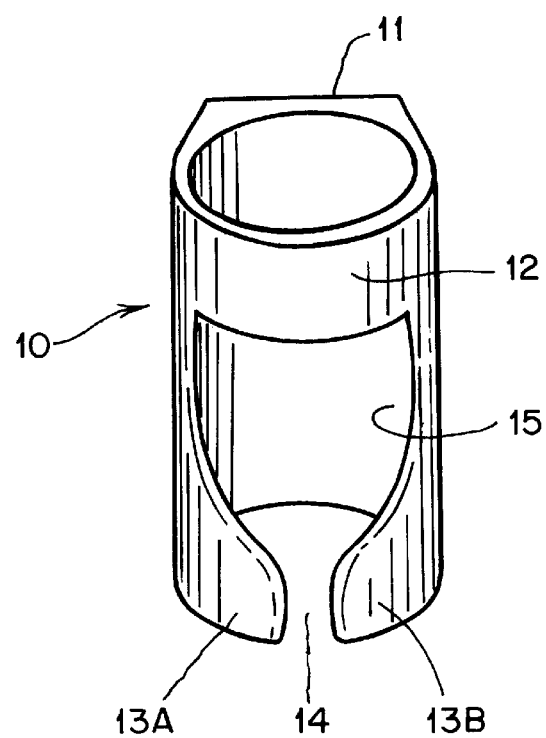
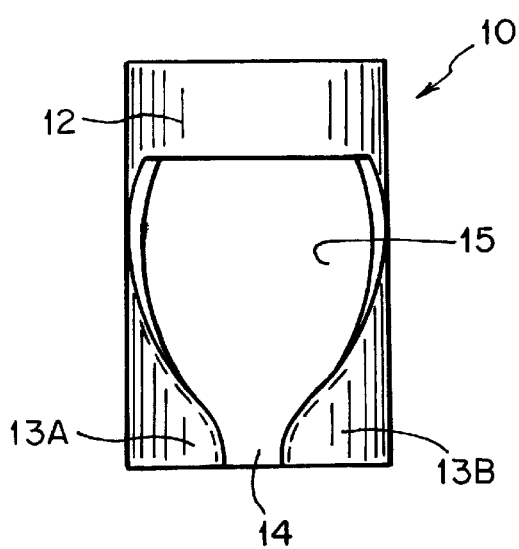
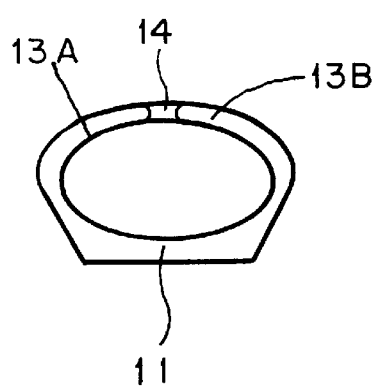
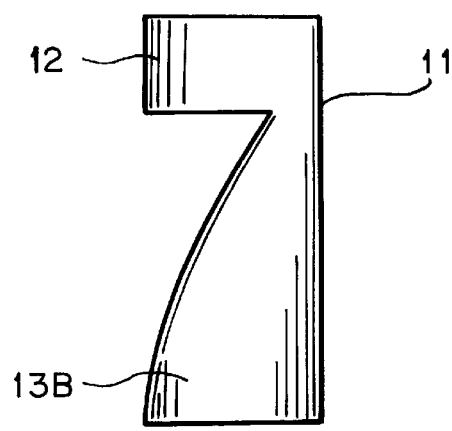

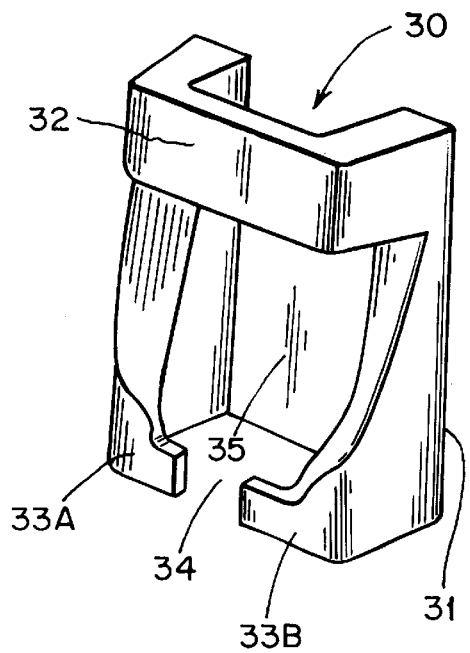
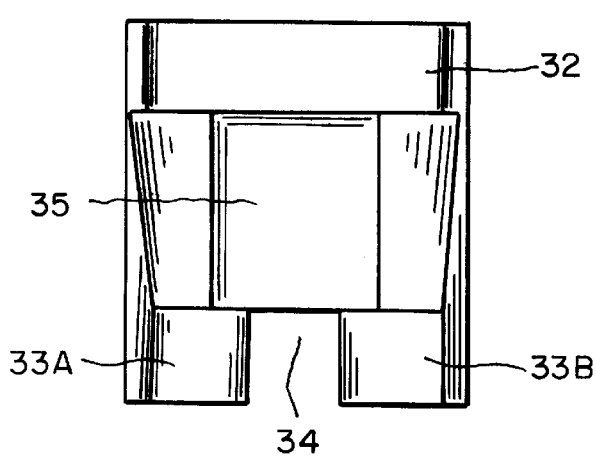
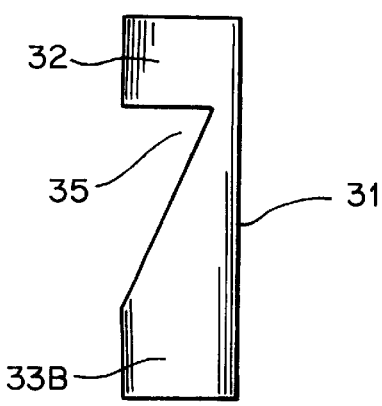
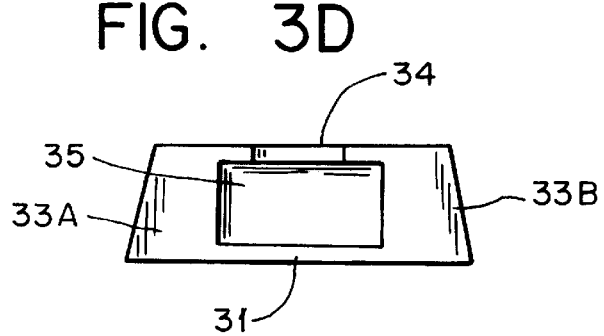

FIG. 4A
FIG. 4C
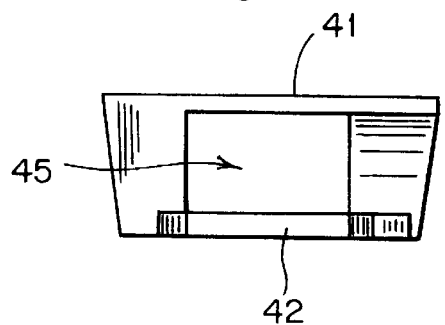
FIG. 4B
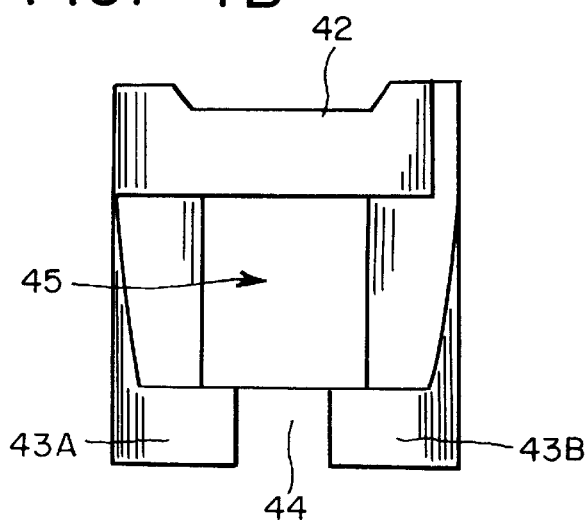
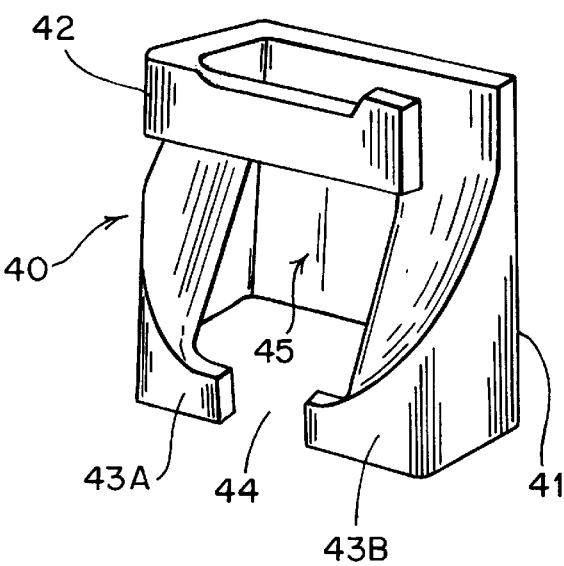
FIG. 4E
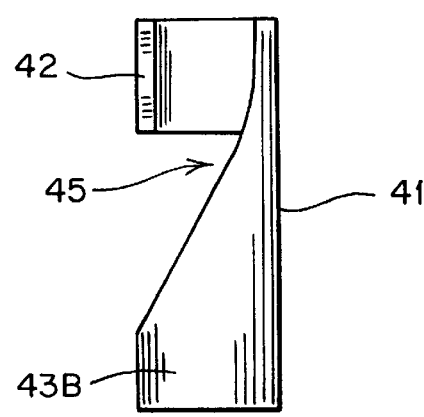
FIG. 4D
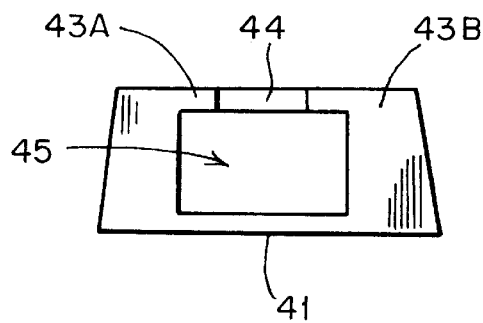

SPECTACLE HOLDER

FIELD OF THE INVENTION

This invention relates to a spectacle holder for containment of a pair of spectacles, the holder being attachable to any convenient surface.

BACKGROUND OF THE INVENTION

It can be very inconvenient and potentially expensive to store a pair of spectacles temporarily at the office, in a factory or while travelling in vehicle. The expense arises because the spectacles may fall to the ground or floor and may be trampled or because the curved outer surface of the lenses may tip over onto grit, scratching the surface.

It is an object of this invention to reduce the chance of the damage mentioned above occurring.

BRIEF SUMMARY OF THE INVENTION

This invention provides a spectacle holder for containment of a pair of spectacles, the holder being attachable to any convenient surface, wherein the holder comprises:
 (a) a body having a substantially flat surface for attachment of the holder to the convenient surface;
 (b) an upper (as viewed in use) clasp adapted to encircle or partially encircle one arm of a pair of spectacles; and
 (c) at least one lower (as viewed in use) side support adapted to maintain the abovementioned arm in position,
wherein the pair of spectacles may be contained by means of insertion of the abovementioned arm through the clasp and through the support or supports and removed as required.

BRIEF DESCRIPTION OF THE DRAWINGS

One embodiment of the invention is illustrated in the accompanying drawings in which:

FIG. 1 shows perspective (FIG. 1A), plan (FIG. 1B) and side views (FIGS. 1C–1E) of the invention (10) comprising a substantially flat surface forming the back portion of the invention (11), a clasp (12) complementary side supports (13A) (13B), a gap between the complementary side supports (14) and an interior hollow portion (15).

Figure 2C:
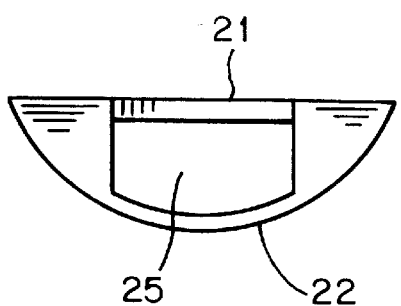
Figure 2A:
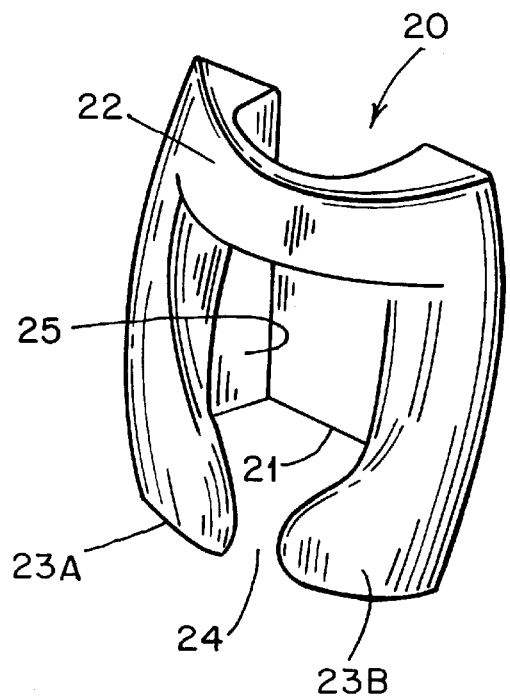
Figure 2B:
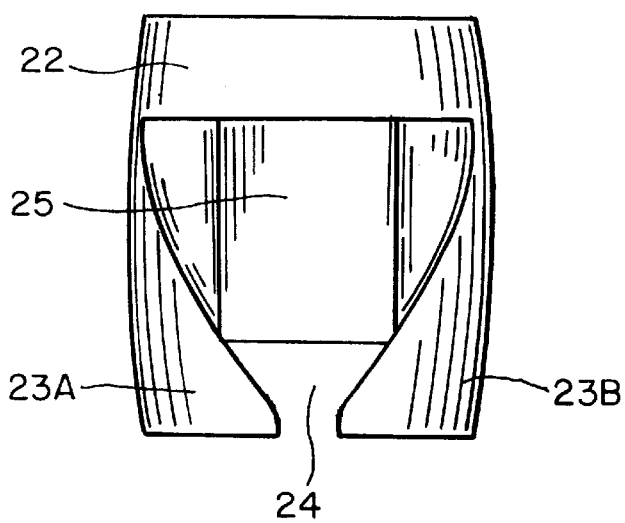
Figure 2E:
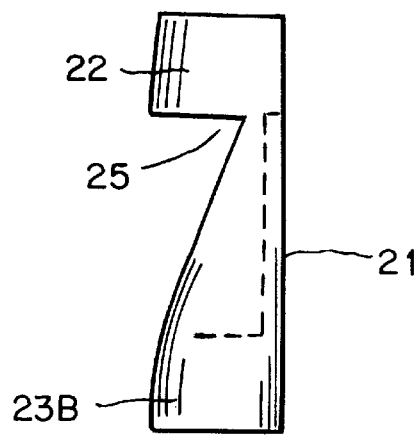
Figure 2D:
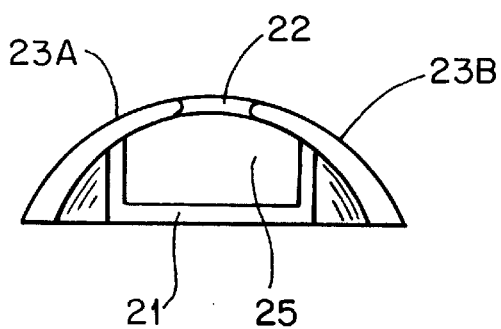

An alternative embodiment of the invention is illustrated in the accompanying drawings in which:

FIG. 2 shows perspective (FIG. 2A), plan (FIG. 2B) and side views (FIGS. 2C–2E) of the invention (20) comprising a substantially flat surface forming the back portion of the invention (21), a clasp (22), complementary side supports (23A)(23B), a gap between the complementary side supports (24) and an interior hollow portion (25).

An alternative embodiment of the invention is illustrated in the accompanying drawings in which:

FIG. 3 shows perspective (FIG. 3A), plan (FIG. 3B) and side views (FIGS. 3C–3E) of the invention (30) comprising a substantially flat surface forming the back portion of the invention (31), a clasp (32), complementary side supports (33A)(33B), a gap between the complementary side supports (34) and an interior hollow portion (35).

An alternative embodiment of the invention is illustrated in the accompanying drawings in which:

FIG. 4 shows perspective (FIG. 4A), plan (FIG. 4B) and side views (FIGS. 4C–4E) of the invention (40) comprising a substantially flat surface forming the back portion of the invention (41), a clasp (42), complementary side supports (43A)(43B), a gap between the complementary side supports (44) and an interior hollow portion (45).

DETAILED DESCRIPTION OF THE INVENTION

Preferably, the substantially flat surface is rectangular in surface area, the plane of which is roughly tangential to the back portion of the spectacle holder.

Preferably, the upper clasp ("clasp") is a cylindrical tube-like portion, or partial cylindrical tube-like portion, which is located at one end of the spectacle holder.

Conveniently, the clasp as a partial cylindrical tube-like portion in one embodiment of the invention, enables ease of insertion and removal of the spectacles from the holder.

Preferably, the clasp, when the spectacle holder is in use, is located between the spectacle body and one arm of the pair of spectacles.

Conveniently, the spectacle body and the spectacle arm form a pincer arrangement which assists in securing the spectacles in the spectacle holder.

Preferably, the clasp is adapted so as to join at least one side support located at the non-clasp end of the spectacle holder.

Preferably, two arc-like side supports point towards each other to form an incomplete cylindrical structure in line with the clasp.

Preferably the clasp is adapted to join the two arc-like supports such that a hollow portion is left between the clasp and the side supports.

Conveniently, the two side supports assist in securing the spectacles within the holder by limiting movement of the spectacles within the holder.

Preferably, the gap between the two side supports opens into the side hollow portion, which hollow portion is located centrally on the upper side (as viewed in use) of the spectacle holder.

Conveniently, this hollow portion aids the positioning and securing of the spectacles within the holder device.

Conveniently, the hollow portion in conjunction with the gap between the two side supports, allows ease of removal of stored spectacles by insertion of the user's fingers into the non-clasp end of the holder and movement up through the hollow, thereby dislodging the spectacles.

In alternative embodiments, the general cylindrical tube-like structure of the spectacle holder is substituted for a rectangular tube-like structure or a combination of cylindrical and rectangular cylindrical elements.

In general, the clasp and side supports form an incomplete tube-like arrangement enabling a pair of spectacles to be safely held by the devices such that the folded spectacle arms are secured centrally within the tube-like structure, the spectacle body rests int eh interior hollow portion; the gap between the complementary side support, and in at least one embodiment, the gap in the clasp structure, allowing ease of insertion and removal of the spectacles from the holder.

The claims defining the invention are as follows:

1. A spectacle holder for containment of a pair of spectacles attachable to a surface, said spectacle holder comprising:
 a body having a substantially flat surface for attaching said spectacle holder to the substantially flat surface;
 an upper clasp as part of said body, said upper clasp being adapted to, at least, partially enclose one arm of a pair of spectacles; and, two arc-like lower side supports pointing toward one another as part of said body for maintaining said arm of the pair of spectacles in position, whereby the pair of spectacles is capable of being contained by insertion of said arm of the pair of spectacles through said upper clasp and through at least one of said lower side supports.

2. A holder as claimed in claim 1, wherein the substantially flat surface is rectangular in surface area, and forms the back portion of the spectacle holder.

3. A holder as claimed in claim 1, wherein the upper clasp is a cylindrical tube-like portion, or partial cylindrical tube-like portion, which is located at one end of the spectacle holder.

4. A holder as claimed in claim 1, wherein the upper clasp is a partial cylindrical tube-like portion enabling ease of insertion and removal of the spectacles from the holder.

5. A holder as claimed in claim 1, wherein the clasp, when the spectacle holder is in use, is located between the spectacle body and one arm of the pair of spectacles.

6. A holder as claimed in claim 5, wherein in use the spectacle body and the spectacle arm form a pincer arrangement which assists in securing the spectacles in the spectacle holder.

7. A holder as claimed in claim 1, wherein the clasp is adapted so as to join at least one side support located at the non-clasp end of the spectacle holder.

8. A holder as claimed in 1, wherein two arc-like side supports point towards each other to form an incomplete cylindrical structure in line with the clasp.

9. A holder as claimed in claim 8, wherein the clasp is adapted to join the two arc-like side supports such that a hollow portion is left between the clasp and the side supports.

10. A holder as claimed in 1, wherein the two side supports assist in securing the spectacles within the holder by limiting movement of the spectacles within the holder.

11. A holder as claimed in claim 9, wherein the gap between the two side supports opens into the said hollow portion, which hollow portion is located centrally on the upper side (as viewed in use) of the spectacle holder.

12. A holder as claimed in claim 9, wherein the hollow portion aids the positioning and securing of the spectacles within the holder device.

13. A holder as claimed in claim 9, wherein the hollow portion in conjunction with the gap between the two side supports, allows ease of removal of stored spectacles by insertion of the user's fingers into the non-clasp end of the holder and movement up through the hollow, thereby dislodging the spectacles.

14. A holder as claimed in claim 1, wherein said body is a substantially rectangular tube-like structure.

\* \* \* \* \*